(12) United States Patent
Jervis et al.

(10) Patent No.: US 6,988,139 B1
(45) Date of Patent: Jan. 17, 2006

(54) DISTRIBUTED COMPUTING OF A JOB CORRESPONDING TO A PLURALITY OF PREDEFINED TASKS

(75) Inventors: Robert B. Jervis, Bellevue, WA (US); Xavier L. Bocken, Bellevue, WA (US); Chad R. Shurtz, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 10/134,335

(22) Filed: Apr. 26, 2002

(51) Int. Cl.
G06F 15/173 (2006.01)
G06F 9/46 (2006.01)

(52) U.S. Cl. ............. 709/226; 709/224; 718/100; 718/104; 718/107

(58) Field of Classification Search ............ 718/100, 718/102, 107, 104; 709/201, 203, 224, 226; 710/268
See application file for complete search history.

(56) References Cited

U.S. PATENT DOCUMENTS

| | | | | |
|---|---|---|---|---|
| 5,031,089 A | * | 7/1991 | Liu et al. ............. | 709/226 |
| 5,469,571 A | * | 11/1995 | Bunnell ............. | 718/103 |
| 5,784,616 A | * | 7/1998 | Horvitz ............. | 718/102 |
| 5,872,569 A | * | 2/1999 | Salgado et al. ......... | 715/764 |
| 5,968,115 A | * | 10/1999 | Trout ............... | 718/107 |
| 6,003,065 A | * | 12/1999 | Yan et al. ............. | 709/201 |
| 6,006,249 A | * | 12/1999 | Leong ............... | 718/107 |
| 6,065,046 A | * | 5/2000 | Feinberg et al. ........ | 709/216 |
| 6,098,091 A | * | 8/2000 | Kisor ............... | 709/202 |
| 6,415,259 B1 | * | 7/2002 | Wolfinger et al. ........ | 705/8 |
| 6,463,457 B1 | * | 10/2002 | Armentrout et al. ...... | 709/201 |
| 6,742,015 B1 | * | 5/2004 | Bowman-Amuah ........ | 718/101 |
| 6,757,730 B1 | * | 6/2004 | Lee et al. ............. | 709/226 |
| 6,788,648 B1 | * | 9/2004 | Peterson ............. | 370/252 |
| 6,842,906 B1 | * | 1/2005 | Bowman-Amuah ........ | 719/330 |

OTHER PUBLICATIONS

Morisawa, Yoshitomi and Koji Torii. 2001. *An Architectural Style of Product Lines for Distributed Processing Systems, and Practical Selection Method*. Vienna, ESEC/FSE. 1-58113-390: pp 11-20.

* cited by examiner

*Primary Examiner*—Majid Banankhah
(74) *Attorney, Agent, or Firm*—Ronald M. Anderson

(57) ABSTRACT

In a distributed computing environment, a queue of jobs is maintained on a job database, along with parameters for each of the computing devices available to process the jobs. A task model defining the job is provided for generating a plurality of tasks comprising each job. The tasks are maintained in a tuple database, along with the status of each task, indicating when each task is ready for processing. As a computing device becomes available to process a task, its capabilities are matched with those required to complete tasks that are ready for processing and the highest priority task meeting those requirements is assigned to the computing device to be processed. These steps are repeated until all the tasks required for the job have been processed, or the job is otherwise terminated.

35 Claims, 4 Drawing Sheets

DISTRIBUTED COMPUTING OF A JOB CORRESPONDING TO A PLURALITY OF PREDEFINED TASKS

FIELD OF THE INVENTION

The present invention generally pertains to a distributed computing environment and method for controlling a plurality of computing devices to carry out a job, and more specifically, to a system and method that employs a database in which a job is predefined as a plurality of tasks that are distributed for processing by a pool of computing devices as a computing device becomes available.

BACKGROUND OF THE INVENTION

There are many types of computational jobs that are sufficiently complex to justify use of a distributed computing environment in which a number of interconnected computing devices cooperate in carrying out the required computations to complete the job. One such job, which arises during the development of new software by a team of programmers, is handling the check-in and testing of new code by each developer on the team. Typically, programmers working on a software development project will submit the changes to the code that have just been made so that a new build of the software incorporating those changes can be produced. Due to human error, programming bugs can be introduced that either prevent a build from being completed or cause errors when an attempt is made to execute a build of the software. As the size of the development team increases, the amount of time required to find the bugs so that they can be corrected grows in proportion. Consequently, large teams of programmers frequently expend more than half of the development time in identifying bugs in the software, so that errors can be addressed. Also, it is not uncommon for an attempted fix of one bug to introduce yet other bugs that must then be corrected.

Automated testing of newly developed software code addresses at least a portion of this problem, since such testing can detect bugs that prevent a build of the code from being completed and can help the team identify and correct bugs that cause runtime product failures. In the past, use of a distributed processing environment for implementing automated testing of software being developed has employed script language to define each of the tests and tasks that must be carried out by the plurality of computers comprising the distributed computing environment. A similar approach has been used for other tasks that are processed by distributed computing systems, to determine how portions of a job are parceled out to the computers in the system. However, script and other forms of defined programming used to specify all of the procedure for handling distributed computing jobs are typically very labor intensive to prepare and maintain. More importantly, such approaches have not been sufficiently flexible in handling the problems that inevitably occur because of errors or failures.

For example, in regard to script controlled distributed computing for handling software check-in and testing of new software builds, if one section of code breaks a new build, it may be difficult to restart the process once a problem that prevented the build from completing has been fixed. In the past, any problem that interrupted the preparation of a new build would likely require that the entire sequence of tasks be started over, which could unduly delay the testing job being completed.

In any distributed computing system, is important to make good use of the available computing devices that are sharing in performing a distributed computing job. It is difficult to efficiently assign tasks comprising the job to each computing device in accord with the capabilities of the computing device, because of the interdependence of the tasks, the time required to complete the tasks and capabilities of the computing devices that become available to do other tasks. As indicated above, resumption of a distributed computing job after an interruption has occurred should be carried out in a manner that enables available computing devices to be provided tasks that remain to be done, without having to redo tasks that have already been completed. The state of each task must therefore be maintained at all times, to enable efficient resumption of a job following an interruption and correction of a problem that caused the interruption.

Accordingly, it is apparent that a more flexible approach is required than has been used in the past. It is important to predefine the tasks comprising a computing job to facilitate distribution of the tasks to the various computing devices as the computing devices become available. The capabilities of the available computing devices in a group of such devices must be matched to the tasks that remain to be done. The use of multiple computing devices to complete a job in this flexible manner will be particularly useful in handling automated check-in of newly prepared computer code and testing of the builds produced from such code, but this approach is not limited to just this application. Instead, it should be useful for handling almost any distributed computing task in which a job can be predefined as a plurality of tasks that will be implemented by multiple computing devices matched to the tasks remaining to be completed.

SUMMARY OF THE INVENTION

In controlling a distributed computing system, the present invention enables jobs to be added to a queue maintained as a database, along with parameters that indicate the capabilities of each computing device comprising the distributed computing system. As a job is readied to be processed, a task model generator loads a task model that has been provided for the job and uses the task model to generate detailed task information and populate a tuple database with records containing the task information. The task model is preferably provided as an extended markup language (XML) text file. These tasks are created as records in the tuple database, and each record includes an indication of the status of the task, i.e., an indication of whether the task referenced by the record is currently ready to be executed (or has already been executed). Each task is assigned to a specific "pool," based upon the capabilities and functionality of the computing device required to process the task. For example, the task may require a computing device that is running a specific operating system, or a computing device that has at least a specified amount of memory. Also, based upon its capabilities and other parameters, each computing device is assigned to a pool set. A pool set can include one or more computing device and include at least one pool.

When a computing device becomes available, e.g., after completing processing of one task, the computing device requests another task from the database of tasks. All tasks that are then ready to be executed and have been assigned to any pool in the pool set of the computing device making the request are prioritized, and the available computing device is assigned the task with the highest priority for processing by the computing device.

Since the status of each task is maintained in the tuple database, a task can be reassigned to another computing device, if for some reason, the task was not completed by the computing machine to which it was previously assigned. The steps of assigning tasks to successively available computing devices is repeated until the job is completed. After all of the tasks comprising a job are completed, or if the job is terminated before completion, the next job in the queue is processed in a similar manner, until all of the jobs are completed or the processing of all jobs is terminated.

Templates that define tasks are preferably included in another database for use in executing the tasks. Since the computing devices are proactive in requesting tasks as each becomes available to process another, and because only tasks ready to be executed that are matched to the capabilities of the computing device and have the highest priority are assigned to each computing device, the jobs are processed efficiently.

Another aspect of the present invention is directed to a memory medium having machine instructions for executing the steps of the method. Yet another aspect of the present invention is directed to a system having a memory in which machine instructions are stored, a network interface for communicating with the plurality of computing devices, and a processor coupled to the memory and the network interface. The processor executes the machine instructions, which cause it to carry out functions generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a functional block diagram of a general purpose computing device, such as a personal computer or server, that is suitable for practicing the present invention, as either one of a plurality of such computing devices in a distributed computing environment, or as a server that controls the processing of a plurality of jobs by a distributed computing environment, in accord with the present invention;

DESCRIPTION OF THE PREFERRED EMBODIMENT

Computing Device/Server for Implementing the Present Invention

Figure 1:
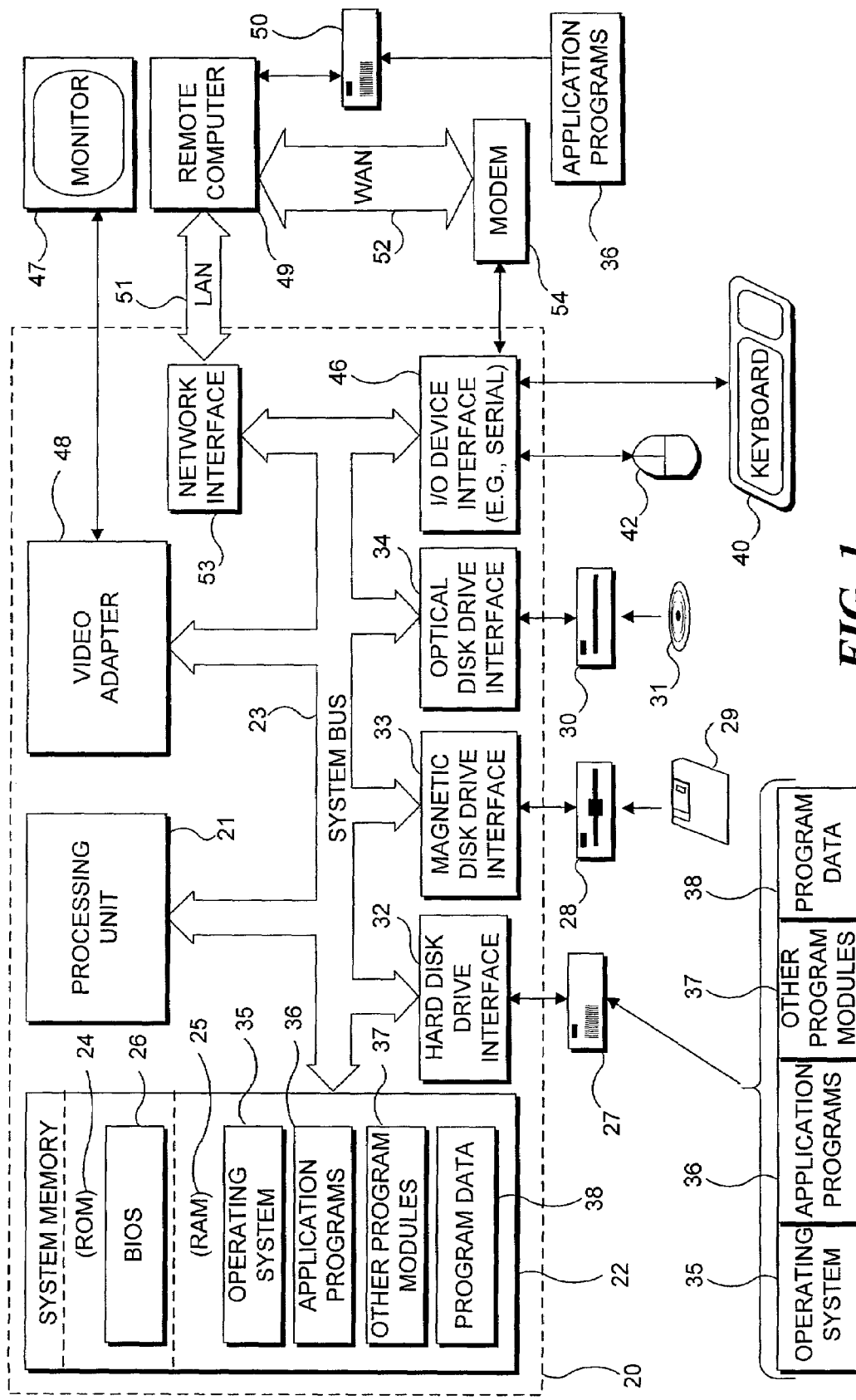

FIG. 1 and the following discussion related thereto are intended to provide a brief, general description of a suitable computing environment in which the present invention may be implemented. This invention is preferably practiced using a plurality of computing devices that are coupled to each other by a communications network. A plurality of the computing devices will preferably be designated as clients and at least one computing device will be designated as a server. The server will include storage of a database that list the client computing devices and parameters related to the capabilities of the client computing devices. The server and each of the client computing devices will typically include the functional components shown in FIG. 1. Although not required, the present invention is described as employing computer executable instructions, such as program modules that are executed by a processing device. Generally, program modules include application programs, routines, objects, components, functions, data structures, etc. that perform particular tasks or implement particular abstract data types. Also, those skilled in the art will appreciate that this invention might conceivably be practiced with other computer system configurations, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like. As indicated, the present invention is preferably practiced in distributed computing environments, where tasks comprising one or more jobs are carried out as defined by databases maintained by one or more servers or other computing devices that are in communication with remote processing devices linked through a communications network. In a distributed computing environment, program modules may be located in both local and remote memory storage devices.

With reference to FIG. 1, an exemplary system for implementing the present invention (corresponding to the server or client) includes a general purpose computing device in the form of a personal computer 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within computer 20, such as during start up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, the image files, and other data for personal computer 20. Although the exemplary environment described herein employs a hard disk, removable magnetic disk 29, and removable optical disk 31, it will be appreciated by those skilled in the art that other types of computer readable media, which can store the images files and other data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, or in ROM 24 or RAM 25, including an operating system 35, one or more application programs 36, other program modules 37, and program data 38. A user may enter commands and information into personal computer 20 through input devices such as a keyboard 40, graphics pad, and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, Web pages, the original and decompressed image files, and/or other information. In addition to the monitor, the server may be coupled to other peripheral output devices (not shown), such as speakers (through a sound card or other audio interface, not separately shown), and printers.

As indicated above, the present invention employ personal computer 20 in a networked environment using logical connections to one or more other computers, such as a remote computer 49, which may be a client computer exchanging data over the network. Remote computer 49 may alternatively be a server, a router, a network PC, a peer device, or a satellite or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are well known and are common in offices, enterprise wide computer networks, intranets, and the Internet.

When used in a LAN networking environment, personal computer 20 is connected to LAN 51 through a network interface or adapter 53. When used in a WAN networking environment, personal computer 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46; i.e., through a serial port. In a networked environment, data, and program modules depicted relative to personal computer 20, or portions thereof, may be stored in the remote memory storage device. It will be appreciated that the network connections shown are exemplary and other means of establishing a communications link between the computers may be used, such as wireless communication and wideband network links.

Exemplary Distributed Computing Environment

Figure 2:
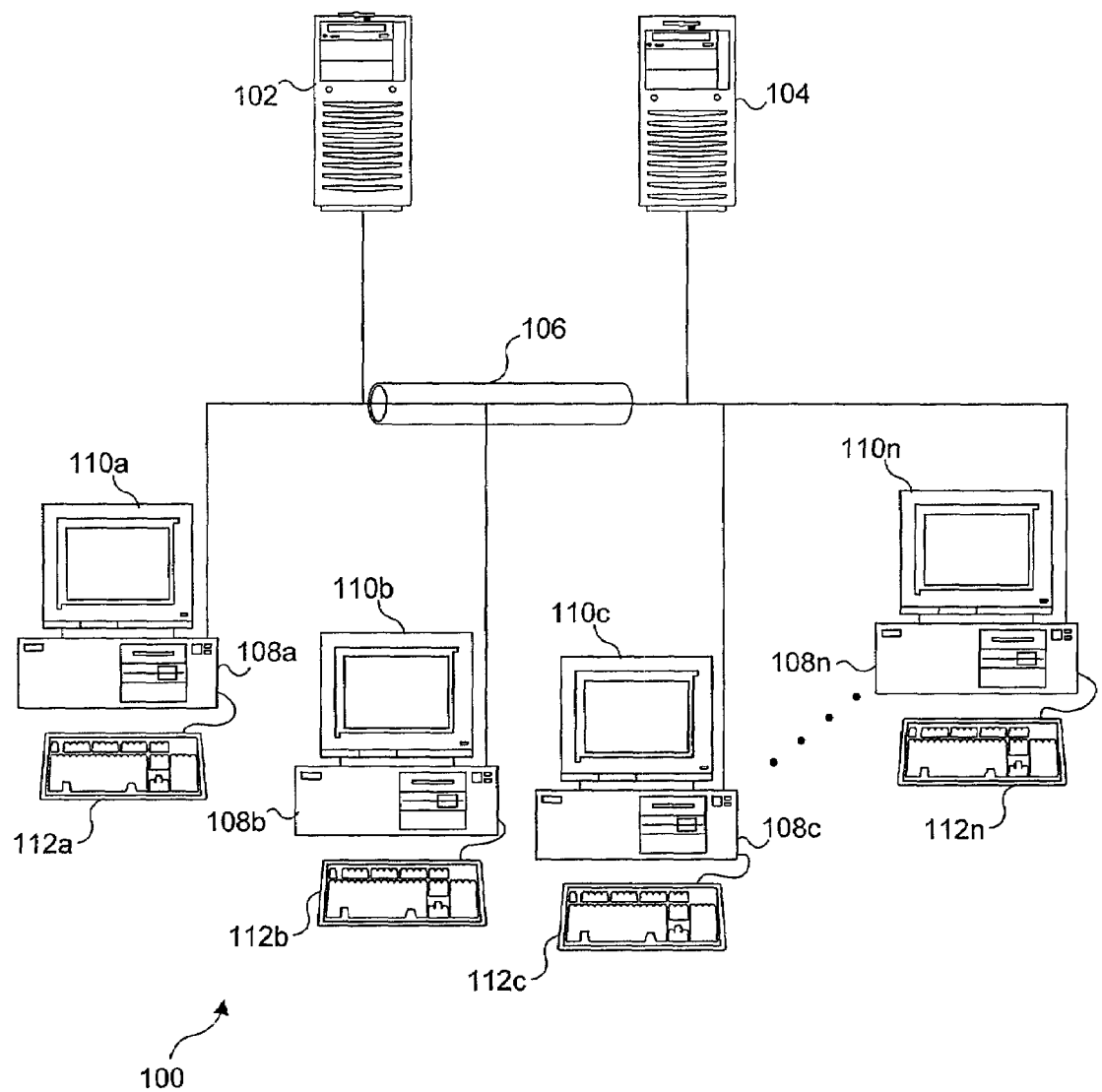
FIG. 2 is a block diagram illustrating a pair of servers and a plurality of computing devices comprising a distributed computing environment, for use in practicing the present invention.

FIG. 2 illustrates a distributed computing environment 100, in which the present invention facilitates efficient processing of a plurality of jobs that are loaded into a queue maintained as part of a database on a server 102. Associated with each job is a task model that is used to generate a plurality of tasks to be carried out in a distributed computing environment and which are maintained within a task database on a server 104. It should be noted that server 102 and server 104 could be a single server, since there is no requirement that the job queue be maintained on a separate computing device from that on which the tasks comprising a job are maintained. Preferably, a network, such as an Ethernet network 106 is used to couple servers 102 and 104 in communication with a plurality of computing devices such as personal computers 108a, 108b, 108c, ... 108n. The number of personal computers provided for executing the task comprising the job could be as few as two, but will typically be many more than two.

In a specific application to which the present invention has been applied, more than 100 personal computers in a software testing facility have been employed to check-in jobs and test successive builds of software under development. The number of computing devices used in the distributed processing environment is not in anyway limited in the present invention, except perhaps by limitations of memory and other computing resources required to carry out the database creation and maintenance by server 102 and server 104. Although not necessarily required for all applications, each computing device 108a–108n in FIG. 2 also includes a monitor and a keyboard. For example, personal computer 108a includes a monitor 110a and a keyboard 112a, and personal computer 108b includes a monitor 110b and a keyboard 112b, etc. Depending upon the nature of the task that must be performed to complete jobs maintained in the job queue on server 102, certain characteristics may be required for at least some of the computing devices to complete a specific task comprising the job. Although many jobs are intended to be carried out in an automated fashion without significant operator intervention on each computing device, it is contemplated that other types of jobs may require an occasional input or operator interaction with the computing device to complete the execution of a task comprising a job. Also, it is contemplated that a particular job may require a specific operating system be loaded and run on the computing device that is employed to carry out a task comprising the job. In such cases, it may be necessary to install the required operating system or other software on at least some of the computing devices comprising the distributed computing network to enable the task of that nature to be carried out. In any case, server 102 maintains parameters for each of the computing devices comprising the distributed computing environment, and these parameters can readily be modified, if operator intervention changes the characteristics and/or functionality of any computing device.

Figure 3:
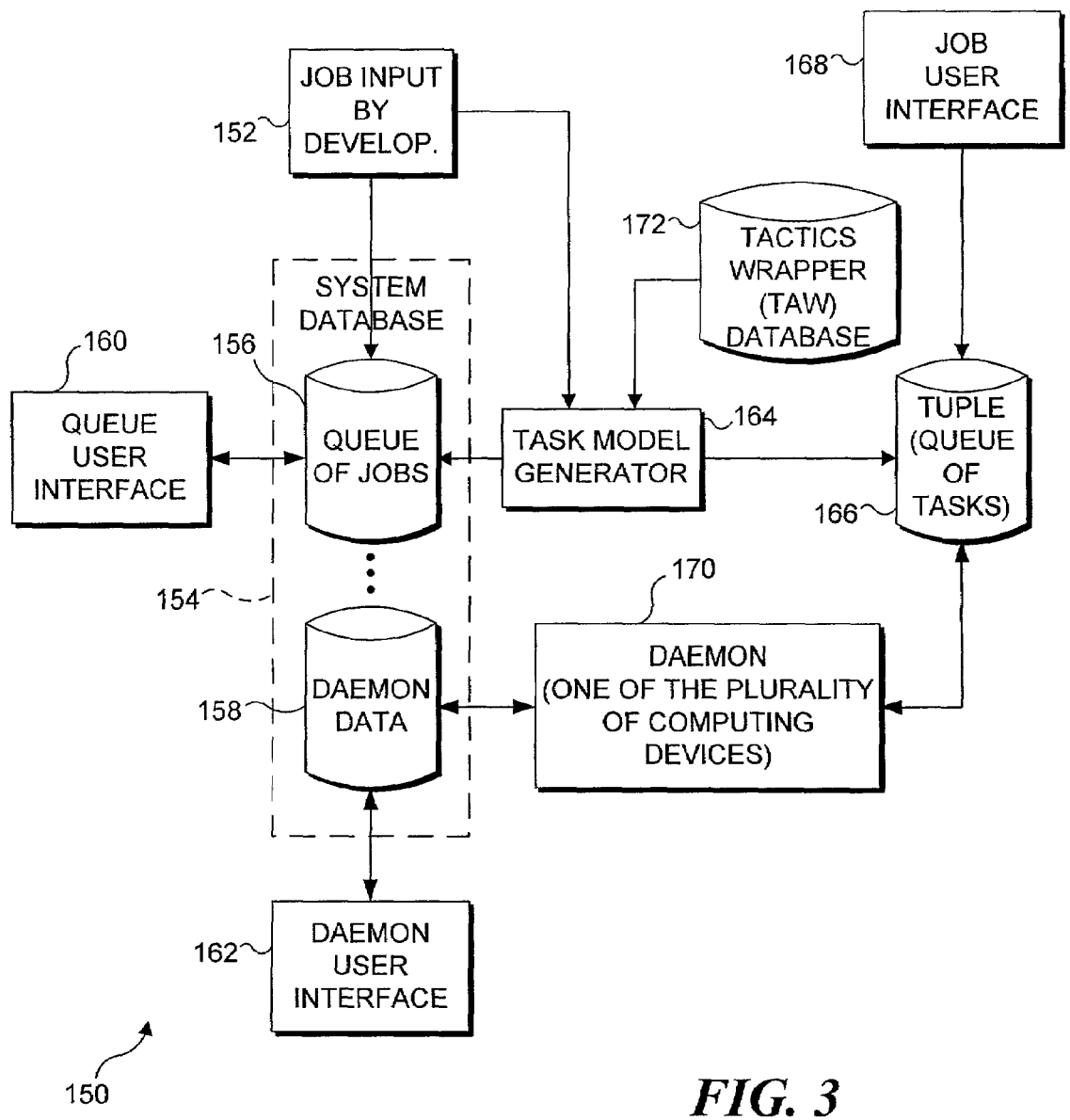
FIG. 3 is a functional block diagram showing functional components of the present invention.

In FIG. 3, a block diagram 150 illustrates functional components of the present invention but does not illustrate each of the computing devices that are employed to process the task comprising a job. This embodiment is somewhat specific to the application of the present invention for processing jobs comprising testing of software builds, as will be evident from a block 152. In block 152, a job is input by a developer of the software, and may represent the changes most recently introduced by that developer. The intention is that each programmer will periodically submit changes in the code made by the programmer, so that the changes can be used to generate a new software build that will then be tested in the distributed computing environment to detect bugs. To evaluate each build of the software and to detect bugs and other problems with a build, the present invention provides a software testing environment using distributed computing to more rapidly and efficiently carry out the tests required to evaluate the build and to detect bugs and other problems. In this case, each test to be performed on a build of the software may comprise a single task, or multiple tasks.

As a job is input by the developer, it is added to a queue of jobs 156 comprising a portion of a system database 154.

In this particular exemplary application of the present invention, the system database was referred to as the "SNAP" database, and the term "SNAP" is used occasionally in the following description of this exemplary application, but does not have any particular significance, even as an acronym. System database 154 is shown within a dash line and includes additional data 158 relating to each of the plurality of computing devices, which is referred to as "daemon data." This term indicates that in regard to the functionality provided by each computing device, the computing devices appear to run unattended processes that are initiated in response to the computing device requesting and being assigned a task. As used herein, the term "daemon" may appear to be synonymous with a computing device. However, it should be understood that the term "daemon" refers to the process running on a computing device, and not the computing device itself, although the two are very much related. A daemon is actually the executable code running on the computing device that is responsible for communicating with the tuple and system databases and for carrying out instructions received from these databases, including executing each task assigned to the computing device on which the daemon is running. The processes comprising a task are defined by tags in the XML files used in the preferred embodiment for specifying the task model from which the tasks comprising each job are generated.

As shown in FIG. 3, a tuple database 166 is used to maintain a queue of the tasks thus generated, that will need to be performed to complete the job currently being processed by the present invention. Before the processing of a job by a plurality of computing devices is initiated, a task model generator 164 populates the tuple database 166 with data on tasks being queued. Thus, the tasks are predefined before the processing of the tasks comprising the current job is carried out by the computing devices.

As a job is being processed, additional jobs can be input by adding to the queue of jobs 156, since the jobs are processed in a serial fashion. In this embodiment, only one job at a time is processed. Adjustments can be made to the queue through a user interface 160. For example, an operator can employ the user interface to modify the order in which the jobs are queued, or to delete a job from the queue, and to carry out other types of job queue maintenance. In addition, user interface 160 can be employed to reconfigure daemons. Thus, an operator can "move" computing devices from one pool to another, or from one job or queue to another, using the interface. If the system is modified so that there are multiple jobs running at the same time and multiple tuple databases, interface 160 can also be employed by an operator to move one computing device from one tuple to another.

In addition, a job user interface 168 is provided to facilitate operator interaction with the tuple database in which tasks are queued, since it may be necessary to modify tasks once they have been generated, particularly if a bug in a job that is being processed causes an interruption in the further execution of the tasks by the plurality of computing devices or daemons. Using job interface 168, an operator can thus selectively delete a task that is interfering with further processing of the job or carry out other maintenance operations on the task queue, as necessary.

Daemon data 158 include information pertaining to the capabilities and functions of each of the computing devices or daemons comprising the distributed computing environment. Based upon the parameters of these devices, each computing device or daemon is assigned to at least one pool set, each pool set comprising at least one or more pools to which each task in the queue of tasks 166 has been assigned. In the initial application of the present invention to testing software, it is common for only a single pool to be assigned to a pool set. However, it is contemplated that for other applications of the present invention, multiple pools may be assigned to a pool set. Since each task in the queue of tasks is assigned to a specific pool, it is relatively convenient to match the capabilities of a daemon 170 to a task assigned to one of the pools within the pool set of the daemon, when the daemon requests a task to execute. In addition, queue of tasks 166 includes a status indication for each task. The status is indicated by a flag that is set when a task is ready to be executed. In many jobs, it will be necessary to execute certain tasks before other tasks are executed. Accordingly, any tasks that are prerequisites for a given task must be completed before a task that depends upon those other tasks has its status flag set to indicate it is ready for execution. When daemon 170 becomes available and requests a task to process from among the tasks assigned to one of the pools within the pool set of the daemon, tasks that meet that requirement and are ready for execution are ordered by their task model priority, and the task with the highest priority is provided to daemon 170 for execution. For tasks that are marked as "virtual," instead of the virtual task being provided to the daemon, a copy of the task is made, marked as having been spawned from the virtual task, and the spawned copy is provided to the daemon for processing. Virtual tasks are those tasks that are typically required for setup of a computing device, to enable other tasks to be completed by it. For example, a virtual task might involve the clean installation of a specific operating system on the computing device, so that a new build of software can be tested on that operating system. Or a virtual task might involve the clean install of a new build of the software program being tested, which must be done before any tests of the software program can be implemented. As the next available daemon requests a task to process, the same step is repeated for tasks that are ready for execution and are assigned to a pool within the pool set of that next available daemon. Thus, the present invention responds to the availability of daemons for executing tasks when the tasks are available, and facilitates execution of those tasks that have the highest priority, based upon criteria that are defined by the task model.

Since many tasks that are implemented for similar jobs can more readily be defined based upon a template for the task, a tactics wrapper (TAW) database 172 is optionally provided in which such templates specify the data for certain of the tasks implemented in processing jobs that might be included in the queue of jobs. However, in other applications, such templates may be less useful, particularly if the jobs being processed tend to be relatively different from each other.

Figure 4:
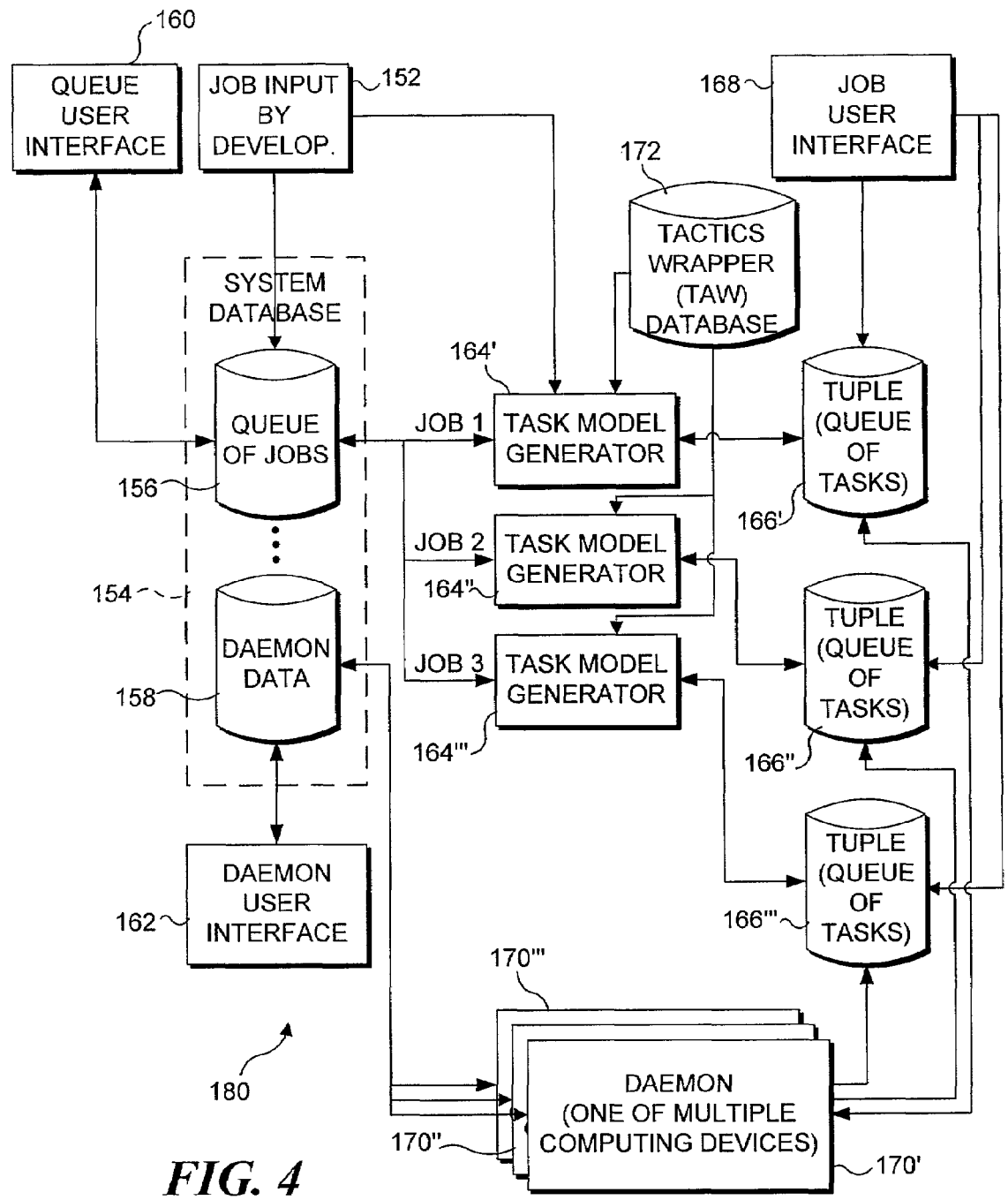
FIG. 4 is a functional block diagram of another embodiment of the present invention.

FIG. 4 includes a block diagram 180 illustrating a second embodiment of the present invention. In this embodiment, many of the same functional components from the embodiment shown in FIG. 3 are included. However, instead of processing jobs sequentially, one at a time, the embodiment shown in FIG. 4 is able to process multiple jobs dynamically at the same time and to respond to the demand for processing tasks in the different jobs when assigning tasks to the daemons that are available and are making a request for an additional processing task. By using dynamic pooling in this embodiment, it is possible to allocate daemons or computing devices between a predefined maximum and a predefined minimum number, based upon the needs of each tuple database or queue of tasks predefined for each different job. This approach also makes efficient use of the computing devices.

As a further alternative, a priority multiplier can be assigned to a specific job to ensure that it receives a higher percentage of the processing capability supplied by the plurality of computing devices or daemons comprising the distributed computing environment. In a simple illustration, a job one (1) is processed by a task model generator 164, which populates a tuple database with a queue of tasks 166'. Similarly, a job two (2) is input to a task model generator 164", populating a tuple database with a queue of tasks 166". Finally, a third job (3) is processed by a task model generator 164''', yielding a tuple database, having a queue of tasks 166'''. Each tuple database can then provide a task to an available daemon or computing device requesting a task for processing in much the same way as described above. However, each tuple database also maintains demand data for its respective tuple of tasks. The demand data are used for dynamically allocating daemons to different jobs and/or tuple databases as a function of the demand existing in a tuple for a particular job, as determined by the priority multiplier. Once a daemon has been moved to a job with a higher demand, it then requests tasks from that job using the mechanism described above. The priority multiplier applied to a job can ensure that it has a greater percentage of the available computing devices assigned to processing its tasks, compared to the other jobs having queues of tasks awaiting processing.

It will be apparent that in distributed computing environments having a large number of computing devices available to process tasks, the embodiment shown in FIG. 4 provides even greater efficiency in making use of the computing devices to carry out jobs in parallel. Such an approach may be particularly useful when the network is a wide area network (WAN), or other network in which many machines are available for processing tasks for a number of related or different jobs.

Writing Task Models and Configuration Files for Use in the Present Invention

A distributed processing system in accord with the present invention works by processing jobs arranged in a queue. Each job is performed by a team of machines, typically in a lab setting. A Task Model describes each discrete step of a job and includes information that enables the system to successfully schedule, manage, and report on the job. A system Configuration File (Config File) describes parameter information needed for the successful operation of the system.

A task model is preferably coded as an XML text file. The task model that is used for a job depends on the type of job to be implemented. When a job is submitted to a queue, it is assigned a type designation. Each job type has an assigned task model file (whose path is stored in the Config File for its queue).

Whenever the TMG loads a new job from a queue, it gets the file name of the Task Model from the Config File information. Every job submission has a corresponding directory on a file share. The TMG looks in that directory for a file with the same name as the task model named in the Config File. If such a file exists in the submission directory, that file is used. Otherwise, the task model named in the Config File is used.

In this way, a single, common task model can be used for all jobs of a given type, or by including a fresh model with each submission, different models can be provided for every job. The convention is to use a common model for checkins, but to copy unique models for specialized jobs. The system job submit function is able to automatically place a file in the submission directory for a new task model that is being checked in, so that the new model will be used for that checkin.

Task models only make sense in the system for which they are written. Part of the information in a task model describes the classes of machines that must be used to run each of the tasks in the model. As a result, understanding the different categories of machine pools is crucial to creating a functioning task model.

Machine Pools and Pool Sets

Each task in a task model is assigned to a specific machine pool. So a task is assigned to a pool based on the hardware requirements and load balancing needs of a job. In principle, each distinct task could be assigned to a separate pool, but in practice, it is preferable to group tasks to simplify system administration, by minimizing the number of pools.

Computing machines available to carry out tasks are assigned to pool sets. A pool set contains one or more computing machine pools. When a pool set consists of a single pool, as they usually do, the same name is used for the set as for the pool. When a computing machine requests a new task to process, it is given the highest priority ready task that matches one of the pools in the computing machine's pool set.

This indirection between tasks and computing machines permits a good deal of administrative flexibility. Test configurations can be run, for example, with new tasks using far fewer computing machines than in a full configuration. The test jobs run slower because they are spread over fewer computing machines, but the same task model can be used without modification on the test system, as is used on a live system. As a result, there is thus greater flexibility to reconfigure the computing machines and even double up functionality if a hardware failure occurs, without modifying the task models involved.

The system is preferably implemented to construct the actual runtime pool names from patterns found in the task model. However, this approach may not be desirable in some cases, because there are hard-coded rules for determining the full pool name that cannot be changed without modifying the system itself. Alternatively, a different approach for determining the runtime pool names might be employed to avoid this problem.

Overall Structure of a Task Model

Although a task model is an XML text file, none of the tags in a task model use any attributes. All information is in simple tags with only a tag name and the text and tag contents. The name of the top-level tag is by convention 'root,' but any top-level tag name can be employed. The TMG does not check this tag name. The contents of the top-level tag are any number of Task, TestTaskTemplate or PerfTaskTemplate tags. Each of these tags can occur any number of times and order does not matter. Related tasks (build, setup, etc.) are preferably generally grouped, but the order is typically not critical. XML Comments can be used to provide additional information to improve the ease with which the model is read and understood by others who might need to modify the model.

Macros

Much of the power of a task model comes from the ability to perform macro substitutions within the text of the task model. Macro references are always in the form of a name enclosed in percent sign characters, e.g., %BuildType%. The values of macros derive from several sources. First, there is a <Macros> tag in the Config File (see below). The contents of this tag define a set of macros to be used in expanding a task model. Second, there is a <Macros> tag in the dev XML file (i.e., the file created as part of submitting a job to the queue). These macros will override any correspondingly named macros from the Config File. Third, there are a set of built-in macros defined by the TMG that override any correspondingly named macro in either of the first two sets. The final set of these macros are called the global macros for the task model. Global macros are applied to the raw text of the Task Model file itself. Thus, global macros can be used to replace structural elements of the XML, as well as the contents of individual tags.

As processing progresses, additional, local macros are defined within the scope of a single TestTaskTemplate or PerfTaskTemplate tag, but the local macros cannot be used to replace XML elements. These local macros are applied only after the XML structure has been parsed, so they can only expand to text contents of tags.

Including Other Files in Config or Task Model Files

Other XML files can be included in Config or Task Model files, by using a specially formatted XML comment. If the XML comment contains the keyword 'include' followed by text enclosed in quotation marks, the enclosed text is the (relative) URL of the file that is to be included. Tags in the file to be included are parsed and attached to the tag hierarchy at the point of the original comment. Note that the root tag of the included files will be stripped away, and second-level tags are those that will be attached at the point of the comment. No global macro substitution is performed on the included files in the current embodiment of the present invention.

As an exception to the general rule that XML files employed in the present invention to control the queue do not use attributes, a special attribute called MergeableTag can affect the way that tags are processed. For example, the following causes the 'global.config.xml' file (which is located relative to the file in which this tag is provided) to be included.

<! -- include "global.config.xml" -->

The MergeableTag attribute can be placed on any tag and controls how tags are processed when the file is loaded. Normally, inclusion of the same tag name more than once represents multiple instances of the same tag name. Thus, when two Task tags appear in the same task model file, it means that they refer to two separate tasks. Sometimes, particularly when including embedded XML source files, it may be desirable to have two copies of the same tag (usually one in the included file and one in the main file) and merge them rather than treating them as distinct copies. If the first instance of a tag that appears in any given context (embedded or included within the same outer tag) contains the MergeableTag attribute with a value of true, then the second instance is combined with the first as if they had appeared as a single tag. This functionality is primarily used in the global Config File created for the Macros tag (see below), to define some of the macros in the global Config File and more macros in the queue-specific Config Files.

Built-in TMG Macros

The following macros are defined by the TMG.

| Macro Name | Value |
| --- | --- |
| %checkinDev% | The alias of the dev. submitting this checkin. |
| %checkinID% | The submit ID of the job being processed. |
| %checkinLocalDir% | The UNC path of the directory containing the dev XML file. (Same as %logDir% below.) |
| %clean% | clean or noclean depending on whether the check-in is a full build check-in or not, respectively. |
| %configPath% | Fully qualified path of the Config file for this queue. |
| %CurrentJobDir% | The UNC path of the directory where job task logs are to be stored, which expands to the same path as %logDir%\job.%job% |
| %logDir% | The UNC path of the directory containing the dev XML file. |
| %TupleDB% | The name of the Tuple database for this queue. |
| %TuplePWD% | The password for the Tuple database of this queue. |
| %TupleServer% | The name of the server machine of the Tuple for this queue. |
| %TupleUID% | The User ID for the Tuple database of this queue. |

Basic Tasks

Almost all task models will have several task tags. Each task tag describes a single command line, i.e., a record in the Tuple database that must be run on one of the computing machines in the system. The details of what a task should do are derived from the tags embedded within the task tag. The TMG supplies a set of default values for tasks, so many of the tags that might otherwise have to be written can be omitted.

Tasks either succeed or fail. Normally, a failing task will cause an entire job to await resolution (although tags can be added to the task model to override this result). Success or failure are determined first by the exit code of the command run. A non-zero exit code signals failure, except for a predefined value that is used to force a machine reboot after the end of a task. But otherwise, the task is treated as successful.

If the exit code is zero, one additional check is done, because on some operating systems, batch files do not return non-zero exit codes. For those situations, if the standard output of a command contains the string 'PROCESS_EXIT_CODE=1' then the task is counted as a failure.

Name Tags

Each task must have a unique name. The task names are employed in the user interface (UI) to identify the tasks and their state. Also, task names are used in dependencies to properly identify the task being depended upon. The name of a task is the text contained within the Name tag.

There is no default value for a Name tag.

Example:

```
<Task>
    <Name>build</Name>
</Task>
```

Command Tag

The Command tag contains the actual text of the command line that is to be executed. Only one command line can be included. If you need to execute more than one command, you must use a batch file or else use multiple tasks. You can include any amount of leading and trailing white space around the command you want run.

In order to take full advantage of the system's ability to rerun tasks, each command that is run should not modify its inputs. Thus, as long as all dependencies have completed, the task can be rerun an indefinite number of times. This ability is often helpful, since it can allow problems to be debugged while a job is running, or enable a failing server to be reset and then rerun failing tasks without having to restart the job and all of the tasks from the beginning.

A Command tag is optional. If none is given for a task, the task is just a placeholder. Such a task can contain dependencies, but no other task can depend on a task that does not includes a Command tag. The TMG will remove tasks without a Command tag when uploading the model to the Tuple database. The primary purpose of a task with no Command tag is to force the creation of specific other chains of tasks through the Dependency tags in the task.

For example, in the following, there is no default for a Command tag:

```
<Task>
    <Name>build</Name>
    <Command> %SourceShare%\build.bat %BuildType% %clean%
        </Command>
</Task>
```

PoolName Tag

Each task, except tasks that have a Virtual tag with a value of true (see below), must have a PoolName tag. The contents of the tag are the base pool name. The final pool name that will actually be uploaded to the Tuple database is derived from this base name and the dependencies that refer to this task.

It is important to remember that the task tags may actually describe a number of almost identical tasks. One of the things that the TMG must do is replicate out the task tags into a fully qualified set of tasks for upload to the computing machines. This replication process is based on the fact that a single 'build' task is used in a check-in task model, but parameters are provided so that the one command line can be used to describe either a Debug or a Retail build, or as many different build types as the project has defined. Essentially, each Dependency on a task defines three attributes, including: the task name, the operating system (OS) platform, and the build type. The OS and build type may be omitted if they are not relevant to the task. When the TMG tries to match tasks and dependencies to the pool sets of computing machines, it will first look for an instance of the named task with matching OS and build type. If one such task has already been created, the dependency is matched to that task. Otherwise, a new task is created for upload that is assigned matching OS and build type.

Pool names as defined in the system computing machine database preferably include up to three parts. Other than the TMG, the rest of the system treats pool names as strings and doesn't care what they contain. When mapping from the PoolName tags in a task model to the data being uploaded to a Tuple database, the TMG appends the OS Platform and Build Type associated with that task.

There is no default for the PoolName tag; an example is as follows:

```
<Task>
    <Name>build</Name>
    <PoolName>build</PoolName>
    <Command> %SourceShare%\build.bat %BuildType% %clean%
        </Command>
</Task>
```

Dependency Tag

Anywhere from none to as many Dependency tags as desired can be included in any task. At a minimum, a Dependency tag must contain either a Name tag or a TemplateName tag. See the discussion below regarding use of TemplateName dependencies.

When using a Name tag in a dependency, up to two more tags can be included as qualifiers for the upstream task. The first can be either a BuildType tag which contains the explicit build type to depend upon, or a SameBuildType tag if it is desired to depend on the same build type as the task containing the dependency. The final tag can be either an OS tag that contains the explicit OS platform to depend upon, or a SameOS tag if it is desired to depend on the same OS platform as the task containing the dependency. The contents of a SameBuildType or SameOS tag can be true or false. The default value for these tags is false. If a false value is included (and no corresponding BuildType or OS tag is present in the dependency), then the dependency has no corresponding build type or OS platform.

Aside from naming the task depended upon, it is also possible to use a ClearOnFail tag to control how the system processes a job. Normally, in a check-in job, it will be preferable not to run tasks if the things they depend upon have failed. Typically, it would be preferable not to run tests against product bits if the build of those bits failed. On the other hand, if using the present invention to run test suites as part of a test lab, for instance, the tests can be run, and then email can be sent containing the results in an automated manner. The email should be sent even if some of the tests have failed. The value of ClearOnFail should be set to true if it is desired to provide a dependency to clear even if the task itself fails to complete successfully. All dependencies clear automatically if the task they depend upon succeeds. The default value of ClearOnFail is false. Note: The ClearOnFail tag inside a Dependency means something different from ClearOnFail inside a task, as explained below.

There is no default for the Dependency tag. If no Dependency tags are specified, the task will be run as soon as a compatible computing machine becomes available.

For example:

```
<Task>
    <Name>CopySetupToInstallShare</Name>
    <PoolName>build</PoolName>
    <Dependency>
        <Name>Build</Name>
        <SameBuildType>true</SameBuildType>
    </Dependency>
    <Command>
        cmd copy__build__setup %OfficeInstallShare%
%BuildType%
    </Command>
</Task>
```

The preceding example describes two tasks run on the build computing machine(s), each running "copy_build_setup," but one for each build type (debug and retail). By using the "SameBuildType," the debug version of this task will wait on the debug version of the Build task; the same result will apply to the retail version of each task.

It is important to realize that this process of assigning build types and OS platforms to tasks operates "from back to front," which means that the assignment starts with tasks that have nothing depending on them. In general, these tasks are the back-end of the job, i.e., the tasks that are performed last, because nothing else depends on them. These tasks must not contain a Command tag or else be tasks that run on machines not associated with a build type or an OS platform. The dependencies in these tasks should either be on more of the same kinds of tasks (no Command tag or no build type and OS qualifier), or the dependencies should mention an explicit build type and/or OS platform. In turn, tasks that are depended-upon (i.e., requiring specific build type or OS platforms) can either use explicit qualifiers, or can use "Same*" tags to propagate their own qualifiers forward.

In the above example, a debug and a retail Build task are generated if a debug and a retail dependency on CopySetup-ToInstallShare exists. The TMG creates the appropriately qualified Build task to match the set of qualifiers on the CopyToSetupToInstallShare task, or:

```
<Task>
    <Name>CopySetupToInstallShare</Name>
    <PoolName>build</PoolName>
    <Dependency>
        <Name>Build</Name>
        <BuildType>debug</BuildType>
        <SameOS>true</SameOS>
    </Dependency>
    <Command>
        cmd copy_build_setup %OfficeInstallShare%
%BuildType%
    </Command>
</Task>
```

The above example is a modified form of a previous example that shows another combination of dependency tag information. In the above example, the task runs on a "build" computing machine, but it only depends on the debug build for the same OS on which this task is run. For this dependency to make sense, the system would have to be running different builds on different OS platforms.

```
<Task>
    <Name>ScanForMergeConflicts</Name>
    <PoolName>sdEnlist</PoolName>
    <Dependency>
        <Name>CopyOffXDocsSource</Name>
        <ClearOnFail>true</ClearOnFail>
    </Dependency>
    <Command>
        cscript //nologo ScanForConflicts.wsf %configPath%
    </Command>
</Task>
```

Still another task is shown in the preceding example. The sdEnlist pool has only one computing machine in it, so there is no need for either BuildType or OS tags in the dependency. CopyOffXDocsSource is another task that runs on the same single computing machine pool, so there is no need for qualifiers on the dependency. Note also that the dependency is marked with ClearOnFail set to true, which means that the ScanForMergeConflicts task will run whenever the CopyOffXDocsSource task finishes, even if the latter task fails.

Timeout Tag

The Timeout tag defines the time, in seconds, that is allowed to elapse before the present invention will abort a task. Timeouts are computed in the system databases and do not rely on the machine that is running the task to be functioning. Tasks aborted due to timeouts are uniquely identified in the UI, but in all other respects are treated like any task failure.

Note that many tasks in a model are going to be quickly completed and will never time out. In those cases, there will be no need to bother setting a timeout. For test tasks that tend to run the newly built product bits, it is preferable to make sure that the timeout values are sufficiently large to avoid false timeouts (say, when a network condition makes one computing machine run a little slower than others) but short enough that when the product being tested hangs, too much time is not wasted waiting for the timeout.

The default Timeout value is 360 seconds (6 minutes). The following is an example:

```
<Task>
    <Name>Build</Name>
    <Timeout>2700</Timeout>
    <PoolName>build</PoolName>
    <Dependency>
        <Name>SetupBuildMachines</Name>
        <SameBuildType>true</SameBuildType>
    </Dependency>
    <Command>
        build %BuildType% %clean% %MSO%
    </Command>
</Task>
```

In this preceding example, the Build task has a timeout value of 2700 seconds, or 45 minutes, because the build takes much longer than the 6 minutes default timeout.

RptTaskGroup Tag

The RptTaskGroup tag is used only for reporting purposes. When the present invention gathers statistics for analyzing the jobs it has run, it groups tasks according to the values supplied in this tag. One of the reports the system produces is called the "Job Timeline." This report defines when each group of tasks begins and ends. By careful grouping of tasks (all functional tests, performance tests, builds, static analysis tools, etc.), it is easier to understand and optimize the performance of the job itself, as well as monitor the evolution of job performance over time.

In yet another example:

```
<Task>
    <Name>SetupBuildMachines</Name>
    <Timeout>3000</Timeout>
    <RptTaskGroup>prebuild</RptTaskGroup>
    <PoolName>build</PoolName>
    <Dependency>
        <Name>ApplyIntegrateChangeList</Name>
    </Dependency>
    <Command>
        setup_build %SourceShare%
    </Command>
</Task>
```

In the example just above, the task sets up a build machine early in the check-in process. Its report group is "prebuild," which is preferably used to flag all tasks that occur before the start of the builds. By segmenting a whole job into its logical pieces, it becomes possible to refine the information in the Job Timeline report without having to modify the report itself.

Virtual Tag

The Virtual tag defines a special kind of task. Normal tasks (where Virtual is false) represent one, or at most, a few 'real' tasks (you can get more than one 'real' task through qualifiers in dependencies). Virtual tasks, on the other hand, represent an arbitrarily large number of potential tasks that will only be determined as the job is run.

This distinction of real and virtual tasks arises from the manner in which jobs tend to operate. In order to use a computing machine to run tests, it is generally necessary to first install the product and an appropriate test harness. These setup tasks need to be run on every computing machine, but only once on each machine at the beginning of a job. Real tasks are only run once, and not again.

Also, setup (or virtual) task failures are typically less interesting than real task failures. If a machine failed to setup for a test, but all the tests did get run on other machines, then the job can finish and if there is a check-in and the real tests passed, the setup failure will not prevent the check-in from going through. Of course, excessive setup failures will sap the productivity of the computing machines, since failed virtual tasks block computing machines from being used for that job.

Virtual tasks are specified in mostly the same way as real tasks. A virtual task needs no PoolName tag. The PoolName to use for a virtual task is defined to be the PoolName of the task depending on it. In this way, the same setup procedures can be used for all computing machines, for example, without regard to build type or OS platform.

When a dependency on a virtual task is written, it is not necessary to specify the OS platform or build type parameters. Any dependency on a virtual task will, by definition, translate into a dependency on the same machine Pool (setup tasks generally need to be run on the same machine as the real tasks that are dependent on them). The default value of the Virtual tag is false.

Another example is as follows:

```
<Task>
    <Name>InstallPiperSupportFiles</Name>
    <Timeout>630</Timeout>
    <Virtual>true</Virtual>
    <RptTaskGroup>setup</RptTaskGroup>
    <Dependency>
        <Name>installOffice</Name>
    </Dependency>
    <Command>
        install_test_support %SourceShare%
    </Command>
</Task>
```

In the preceding example, the task is used to install the test harness on a newly cleaned computing machine. The Virtual tag forces all computing machines in the pool that is assigned this task to run a spawned instance of the task before any tests are run.

Reboot Tag

A Reboot tag indicates whether a daemon should reboot the computing machine after the task is run on it. Many install or machine cleanup tasks need to reboot to complete their operation. In order for the daemon to correctly report the completion status of the task, the daemon must initiate the reboot after the task is done. The presence of a Reboot tag with a value of "true" forces the computing machine to reboot after running the task.

Normally in the present invention, if a daemon is stopped and restarted on a computing machine, the system assumes that the computing machine's contents are dirty, so it will reschedule all of the setup tasks to restore the computing machine to a known state. However, when the daemon restarts after a programmed reboot operation (triggered by a Reboot tag or the predefined exit code), the system recognizes that a reboot had been done and therefore can assume that the state of the computing machine is known. Clearly, this approach is somewhat risky if an operator intervenes during the programmed reboot and changes the computing machine, but in practice, this problem does not happen. The default value of the Reboot tag is false.

Another example is as follows:

```
<Task>
    <Name>cleanOS</Name>
    <Timeout>330</Timeout>
    <Virtual>true</Virtual>
    <Command>
        d:\xdlab\bin\cleanos .bat /y %clean%
    </Command>
    <Reboot>true</Reboot>
</Task>
```

In this example, the cleanOS task is run to start the process of reimaging a computing machine. The cleanOS batch file only sets a flag so that the reboot will boot into a host OS image, which then performs the copying to clean up the test image and resets it to a known state. To start that process, the daemon is told to reboot. The clean operation is then performed on the host OS (which doesn't spawn a daemon process). When the cleaning operation is completed, the newly cleaned test OS is rebooted again, the daemon is restarted, and the system continues where it left off.

Priority Tag

The Priority tag specifies a relative priority of a task. This priority is only compared against the priorities of other tasks that are ready in the same pool, to determine the task that will be run first. The value of a Priority tag is an integer.

For most tasks, it will not be necessary to specify a priority. More often than not, dependencies will determine the execution order of tasks, but there are circumstances where load leveling across multiple computing machines can take advantage of differing Priority values. In one application of the present invention, for example, all functional tests are assigned a priority equal to the timeout value, which is monitored so that the priority is close to the actual running time of the test. That way, the longest tests are selected first and more tests are defined in the Tuple than there are computing machines available to run them, the net effect is to lower the total running time of a job. Long tests are run first, then as computing machines become available, shorter and shorter tests are run by them. By the time the end of the list of tests is reached, those tests are quickly run on the available computing machines and on average, there will be less idle time before the whole suite of tasks or job is finished. In contrast, a purely random ordering of the tests might run the longest test last, leaving all but one machine idle until that long running test is finished.

The following is another example:

```
<Task>
    <Name>cleanOS</Name>
    <Timeout>330</Timeout>
    <Priority>12000</Priority>
    <Virtual>true</Virtual>
    <RptTaskGroup>setup</RptTaskGroup>
    <Dependency>
        <Name>ApplyIntegrateChangeList</Name>
    </Dependency>
    <Command>
        d:\xdlab\bin\cleanos.bat /y %clean%
    </Command>
    <Reboot>true</Reboot>
</Task>
```

In the above example, the cleanOS task is assigned a priority of 12000. The priorities of the various test tasks are preferably given as their timeout values (and they tend to run for no more than a few hundred seconds each), so a value of 12000 is guaranteed to be larger than the longest test timeout (200 minutes is a very, very long time). This approach insures that the cleanOS task is scheduled first on a test machine before anything else is run when a new job starts.

ClearOnFail Tag

The ClearOnFail tag inside a Task affects how a current preferred embodiment of the present invention processes a job. The normal rule for processing with the system is to stop and wait on a job if any of the tasks in that job failed. Even if there are ClearOnFail tags on dependencies inside the task model, a failed task will still halt the job and keep the job alive in the system until an operator either manually aborts the job or reruns (and eventually passes) and/or ignores all such failures.

For a task having the ClearOnFail tag, a failure in that task will not stop a job from completing. This tag is primarily useful for running test suites in a test lab, or if the checkins simply include "advisory" tests (ones that will not stop a check-in from completing, but which are worth running for their informational value).

If it is desired that dependencies clear for a task with ClearOnFail set to true, it will be necessary to decorate each dependency on it with a ClearOnFail tag set to true as well. The default value of the ClearOnFail tag is false.

The following is still another example:

```
<Task>
    <Name>Test1</Name>
    <PoolName>checkinTest</PoolName>
    <Dependency>
        <Name>InstallPiperSupportFiles</Name>
    </Dependency>
    <Command>
        piper %TestCaseShare%\%Script%
    </Command>
    <ClearOnFail>true</ClearOnFail>
</Task>
```

The preceding example is of a test task where ClearOnFail is true. This test will be run, and the results can be analyzed and reported, but a failure will not hold the whole job in the system.

DoOnAbort Tag

The DoOnAbort tag is used to define tasks that are only run in response to an operator hitting the Job Abort button on the UI. Typically, it will be necessary to clean up state or send email notices differently if a job is succeeding rather than aborting. DoOnAbort tasks start out Not Ready when a job is loaded into the SNAP databases. They remain not ready, and the job will complete with them still not ready if the job is not aborted and nothing critical fails. As soon as an operator starts a job Abort, these tasks become ready and all other running tasks are aborted.

The DoOnAbort tasks are then scheduled and executed just like normal tasks. An Aborted job will complete as soon as all the DoOnAbort tasks are complete. The default value of the DoOnAbort tag is false.

Note the following example:

```
<Task>
    <Name>AbortJob</Name>
    <Timeout>3000</Timeout>
    <PoolName>sdEnlist</PoolName>
    <DoOnAbort>true</DoOnAbort>
    <RptTaskGroup>abortjob</RptTaskGroup>
    <Command>
        cscript sdtasks.wsf %configPath% revert
    </Command>
</Task>
```

In this example, the AbortJob task is defined as a DoOnAbort task. Like most DoOnAbort tasks, no dependencies are needed. This particular task reverts the files that were being checked in.

InitialState Tag

The InitialState tag is not commonly used. Tasks typically go through a set of states during the course of a job. These states are: Not Ready, Ready, In Progress, Completed, or Failed. If the initial state is set to Ready, the system will check the task model and automatically set the initial state to Not Ready if there are any dependencies in the task. Setting a task's initial state to In Progress is not allowed.

The only interesting settings of this tag are Completed or Failed. Including tasks like this in a model may prove useful if it is expected that there may be a need for a manual intervention some of the time to carryout some optional procedure. The optional procedure is placed in a task with an InitialState of Completed or Failed (depending on the exact nature of how the rest of the model is to function). Then, when it becomes necessary to run that task, the task is simply rerun through the UI. By clever combination of InitialState, dependencies and ClearOnFail settings, it is possible to achieve a very useful functionality from the system, although this tag is normally not used. The exception is a control job. Control jobs are generally running continuously and are designed to monitor system events and respond only when those events fire (see the discussion of the Event tag below). In control jobs, most tasks are marked with an InitialState of "Not Ready," even when they have no dependency.

By default, the InitialState of a task is Ready if it has no Dependency tags and Not Ready if it does have dependencies.

The following example illustrates the use of this tag:

```
<Task>
    <Name>HoldJobFunc</Name>
    <Timeout>60</Timeout>
    <Priority>500</Priority>
    <PoolName>checkinTest_ie</PoolName>
    <RptTaskGroup>misc</RptTaskGroup>
    <Dependency>
        <Name>VerifyIE</Name>
    </Dependency>
    <Command>
        Echo Doh!
    </Command>
    <InitialState>Fail</InitialState>
</Task>
```

In this example, taken from an ad hoc job used to do a one-time reimage job on all of the computing machines, this task was used. The dependency on VerifyIE is on a Virtual task that is the final stage of the reimage process. This task was included to have a place holder that would keep the job running while all the computing machines completed their reimaging work. Once the operators verified that all the computing machines had run, they set the system to Ignore this task, and the job completed.

Remember that Virtual tasks will be run once on each machine that becomes available, but the job can complete without all the machines running all the virtual tasks of the model. Also, to trigger any virtual tasks at all, it is necessary to have one real task in each pool that is to run a virtual task. The reimage job, from which this example came, had a string of three virtual tasks to perform on each computing machine. Without this task in the model, the first computing machine to finish its virtual tasks in each pool would run the real task for that pool and when those real tasks were all done, the job would be completed and flushed before all of the other computing machines had completed their work. This trick of using the InitialState guaranteed that would be enough time to enable the computing machines to complete their tasks.

Norerun Tag

The Norerun tag is another Boolean flag that affects the operation of the control UI. Normally, any task can be rerun on the present invention. However, in a performance testing job, an individual iteration of the performance test cannot simply be rerun. The results would be distorted, since some iterations would be run once and others would be rerun multiple times. Statistically, this uncontrolled rerunning would invalidate the sample.

By using the Norerun tag, a task can be marked so that the UI will not offer the Rerun button as an option. The default value of the Norerun tag is false.

The following example illustrates the use of this tag:

```
<Task>
    <Name>ClearPerfResults</Name>
    <PoolName>sdEnlist</PoolName>
    <Dependency>
        <Name>Build</Name>
        <BuildType>%BuildType%</BuildType>
    </Dependency>
    <Command>
        perf.bat %ScenarioID% CleanDecision
    </Command>
</Task>
```

```
<Task>
    <Name>PerfTest-boot-%iteration%</Name>
    <PoolName>checkinPerfTest</PoolName>
    <Norerun>true</Norerun>
    <Dependency>
        <Name>InstallPerfSupportFiles</Name>
    </Dependency>
    <Dependency>
        <Name>ClearPerfResults</Name>
    </Dependency>
    <Command>
        perf.bat %ScenarioID% %Source%\scripts\%Script%
    </Command>
</Task>
```

In the preceding example, the performance test iteration task is marked as NoRerun. Each iteration of a performance test has exactly the same format. The ClearPerfResults task does not have a Norerun tag, so it cannot be rerun. This task clears the whole set of results, and because each iteration depends on it, rerunning the ClearPerfResults task will also rerun all the iterations. That way, when a final pass/fail decision task (which depends on all the iterations) is run, a complete set of results will be available to evaluate, and results from two different runs will not be mixed.

UseNotReadyCountForDemand Tag

The UseNotReadyCountForDemand tag affects how this current preferred embodiment of the present invention dynamically balances computing machines in a set of jobs. If computing machines are not being dynamically pooled, this tag will not be needed. The dynamic pooling algorithm uses the demand for machines as an input. When dynamically pooling machines, the system will not allocate more machines to a job than there is work in the job that must be done. The demand is determined by counting the total number of tasks in a pool that are ready to be implemented.

However, because setup times on the computing machines are often relatively long, it is important to complete that work before the builds are finished. As a result, it is necessary to count the test tasks in the demand, even though they will not be ready until after the builds are completed. So, the UseNotReadyCountForDemand tag is used in all such test tasks. The default for UseNotReadyCountForDemand is false.

The following example illustrates the use of this tag:

```
<Task>
    <Name>FuncTest1</Name>
    <PoolName>dGAT</PoolName>
    <UseNotReadyCountForDemand>true</UseNotReadyCountForDemand>
    <ClearOnFail>true</ClearOnFail>
    <Dependency>
        <Name>TestSetup</Name>
    </Dependency>
    <Command>
        c:\drt\test\bin\qpiper.bat %pkTestCase%
    </Command>
</Task>
```

This example was taken from an ad hoc job type that ran as a service to allow developers to run build verification tests. The computing machines were dynamically pooled in that service, so several jobs could be running simultaneously, and the throughput would balance across the various users. Note the use of ClearOnFail. Since this was not a check-in job, it was important to just get the results and post them back to the developers.

Event Tag

The Event tag names a defined system event. There are five predefined system events in this initial embodiment, including: JobStart (to indicate when the job starts), JobFinish (to indicate when the job completes successfully), JobAbortStart (to indicate when the UI Abort button is clicked; the job is not finished yet because DoOnAbort tasks still have to run, and eventually, 'In Progress' tasks still have to be aborted), JobAbort (to indicate when the aborted job completes), and MachineDead (to indicate when a machine is unresponsive). All of theses events are appending <JobPk> and <JobNm> tags to the XMLParams. In addition, the MachineDead event also appends <TaskPk>, <TupleMachinePk> and <SystemMachinePk> tags. These events are defined within the Tuple stored procedures code, and it is contemplated that more events might be added in future embodiments of the present invention.

This tag is used primarily in control jobs and is designed to enable populating a control job with a range of tasks that respond to system events. As many different events can be named in a task as desired, one event per Event tag. Events fired by a job are able to trigger tasks in their own job, or in the control job; there is no cross-job support. Nor is there cross-Tuple support, since events are referenced within a single Tuple database.

The InitialState of a task with Event tags must be "Not Ready." Otherwise, the task will run when the job is initially loaded. A task hooked up to an event acts as a placeholder; when the event fires, a copy of the task is made within the Tuple database, and its state is set to "Ready." If several tasks are linked to the same event and have dependencies among them, the dependencies are copied, which ensures that tasks depending on other tasks stay in a "Not Ready" state. Clearly, some events (like JobFinish) occur once per job, but others (like MachineDead) could occur several times, therefore spawning several copies of the same task. There is no default for the Event tag.

See the following example:

```
<Task>
    <Name>ctrlJob_TransferRptData</Name>
    <InitialState>Not Ready</InitialState>
    <PoolName>sdEnlist</PoolName>
    <Event>
        <Name>JobFinish</Name>
    </Event>
    <Event>
        <Name>JobAbort</Name>
    </Event>
    <Command>
        cscript %SnapShare%\bin\ctrlJob_Transfer.wsf
    </Command>
</Task>
```

In this example, the transfer of data from the live databases to the system reporting database is driven by this task in the control job. The system initiates a JobFinish or JobAbort event (depending on how the job ended) at the termination of every job. By catching these events, this task will respond and do the necessary bookkeeping work to update the reporting database.

XMLParams Tag

The XMLParams tag provides an alternate way to pass arguments to a task through a daemon. Typically, macros on the task command line are used to parameterize the task execution. The XMLParams tag enables arbitrary XML to be passed to a task. The XML will be piped to the task's StdIn at task execution time by a "tpdaemon.exe" process, along with system XML parameters that are piped to the task's StdIn, regardless of the presence of the XMLParams tag (which contain system and Tuple database credentials, and eventually event-related parameters, like the current JobNm, JobPk and TaskPk). The length of the content of the XMLParams tag is limited to 7700 characters in this preferred embodiment. There is no default for the XMLParams tag.

The following example provides an illustration of this tag.

```
<Task>
    <Name>ctrlJob_TransferRptData</Name>
    <InitialState>Not Ready</InitialState>
    <PoolName>sdEnlist</PoolName>
    <XMLParams>
        <Rpt_Server>myReportingServer</Rpt_Server>
        <Rpt_Database>Snap_Rpt</Rpt_Database>
        <Rpt_UID>aUser</Rpt_UID>
        <Rpt_PWD>aPassword</Rpt_PWD>
    </XMLparams>
    <Event>
        <Name>JobFinish</Name>
    </Event>
    <Event>
        <Name>JobAbort</Name>
    </Event>
    <Command>
        cscript %SnapShare%\bin\ctrlJob_Transfer.wsf
    </Command>
</Task>
```

In the preceding example, in order for the ctrlJob_TransferRptData task to move job data from the system and Tuple databases to the Snap_Rpt reporting database at the end of the job, it has to know the SQL login credentials for the three databases. Credentials for the Tuple and system databases are automatically piped to the task's StdIn by the tpdaemon.exe process, so using XML parameters, credentials for Snap_Rpt are added. The task receives the following on its StdIn:

```
<xmlparams>
    <tupledb>tuple</tupledb>
    <tupleserver>myTupleServer</tupleserver>
    <tupleuser>aAdmin</tupleuser>
    <tuplepassword>aAdmin</tuplepassword>
    <snapdb>snap></snapdb>
    <snapserver>mySnapServer</snapserver>
    <snapuser>aAdmin</snapuser>
    <snappassword>aAdmin</snappassword>
    <jobpk>0</jobpk>
    <taskpk>31256</taskpk>
    <runcnt>1</runcnt>
    <JobPk>2501</JobPk>
    <JobNm>main</JobNm>
    <Rpt_Server>myReportingServer</Rpt_Server>
    <Rpt_Database>Snap_Rpt</Rpt_Database>
    <Rpt_UID>aUser</Rpt_UID>
    <Rpt_PWD>aPassword</Rpt_PWD>
</xmlparams>
```

All parameters up to <runcnt> automatically come from tpdaemon.exe. JobPk and JobNm have been added, because this task was triggered by the JobAbort/JobFinish event. Rpt_* tag is coming from the model's <XMLParams>, which are specified for this task. Note that the first <jobpk> contains 0 because the task is running within the control job. The <JobPk> containing "2501" refers to the job that triggered the event.

Test Task Templates

A task model can contain any number of TestTaskTemplates, including zero. Each TestTaskTemplate includes a name, a SQL database query and a template for a task and for a dependency. When the TMG processes the task model, it runs the SQL query. This query produces a record set in which each row of the set is used to generate one task in the resulting model (using the Task tag in the TestTaskTemplate as the pattern). The columns of the record set each become a macro that is expanded in the body of the template. The Dependency tag in the template is used to hook each of the generated tasks into the overall model.

There are no restrictions on the columns of the record set except the column names won't be usable as macros if they have the same name as other macros derived from the SNAP config file, or the job's dev-xml file. The TMG does not attempt to substitute record set macro names until after already expanding all the global macros. Because of this, the global macro references are long gone before comparing against the record set column names.

Name Tag

The Name tag of a TestTaskTemplate must be unique among all TestTaskTemplate and PerfTaskTemplate tags in a model. When a Dependency tag anywhere in the model uses TemplateName instead of Name, the dependency is on either a TestTaskTemplate or a PerfTaskTemplate. The TemplateName in the dependency must match one of the named templates in the model.

For a TestTaskTemplate, a dependency on TemplateName produces a dependency on each of the generated tasks from the template. The form of each dependency is taken from the Dependency tag in the TestTaskTemplate (see below).

Query Tag

A TestTaskTemplate has one Query tag. The content of this tag is a SQL query string, which will be passed through ActiveX Data Objects (ADO) to SQL Server to be resolved. The query can be a SQL select statement or a call to a stored process, so long as the result is a record set.

Dependency Tag

A TestTaskTemplate has only one Dependency tag. The contents of this tag are not quite the same as for a normal task. Since the Dependency tags have a one-to-one correspondence with generated Tasks, there is no real need to do a symbolic name, build type, OS lookup. The TMG will simply bind the Dependency directly to the generated Task for that test case. As a result, the Name, BuildType, SameBuildType, OS and SameOS tags are all ignored. The reason the Dependency tag is used within a TestTaskTemplate is to provide a place to put any desired <ClearOnFail> tag for the test dependencies, and for any other tags that might be added in future embodiments of the present invention. The dependency will be inserted in any task that depends on the TemplateName for the template.

Task Tag

A TestTaskTemplate has only one Task tag. The contents of this tag are the same as for a normal task, with a few exceptions. All tags that can appear on a normal Task tag may appear in a TestTaskTemplate. In addition, inside a TestTaskTemplate, a Task tag contains two additional tags: BuildType and Platform. These additional tags are used in determining the dependencies that are generated and the specific BuildType and Platform values when replicating out tasks. Although applied in this preferred embodiment, this requirement is perhaps overly restrictive, but it is the only way in the embodiment to specify test tasks in a template. The reason test tasks are required is that when expanding a dependency on a normal task, the dependency supplies the necessary build type and platform information. However, when a dependency is determined by a template, the implied individual task dependencies (on the tasks generated by the template) vary according to the generated tasks themselves.

It is contemplated that the relevant information can actually appear in the Dependency tag of the template as well, so the BuildType and Platform tags would then be redundant. This information is now supplied in the Task tag itself, and any BuildType or OS tags in the Dependency listed in the TestTaskTemplate are ignored.

There is also one other difference in the treatment of the tags inside the Task tag in any template (whether a TestTaskTemplate or a PerfTaskTemplate). The pool name associated with a task is specified differently for Tasks inside a template. The PoolName tag normally defines just the base part of a pool name (without any platform or build type included). However, inside a template, the full pool name, including the colons used as separators of the parts of the name, is provided. Normally, macros are used for the platform and build type parts of such pool names.

Performance Task Templates

The second and more complex form of template supported by this embodiment of the present invention is the performance task template. This template describes a set of related tasks, rather than just one task for each row of data returned from its query. Like TestTaskTemplates, there can be any number of PerfTaskTemplate tags in a task model, including zero.

Performance task templates are designed to run performance tests. In such tests, the test case itself is typically run multiple times and then the average of the resulting measured times is determined, with some measurements (like the highest and lowest results from a set of runs) being discarded depending on exactly how it is desired to validate the results. This approach leads to the concept of an iteration being the specific run of the test case itself and of a decision being the task that collects the individual results and decides on a pass or fail result, overall. In this approach, the individual iterations should only fail if the application actually crashes, hits an assert, or otherwise malfunctions. It is the decision task that governs the pass or failure of the performance result.

When performance tests are run, the operator does not interactively pick and choose the iterations of a performance test that are to be rerun. So typically, the iteration task will have a Norerun tag set to true. In order to rerun the whole performance test, a clean decision task is provided that serves as a placeholder (that has a functioning rerun button).

Like TestTaskTemplates, a PerfTaskTemplate contains a name and a SQL query, and the TMG runs the query against the same test case data source that TestTaskTemplates use. Each row returned from the query produces one additional set of performance tasks. Each such set is called an instance of the PerfTaskTemplate. And like TestTaskTemplates, each column of the query becomes a macro available for expansion in the command line and other tags of the included Task and Dependency tags.

There are no restrictions on the columns of the record set except that the column names will not be usable as macros if they have the same name as other macros derived from the system Config File, or the job's dev-xml file. The TMG does not attempt to substitute record set macro names until after already expanding all the global macros. Because of this, the global macro references will be gone before they can be compared against the record set column names.

Unlike the TestTaskTemplate, which produces only one task per row of its query, there are three distinct kinds of tasks generated for each PerfTaskTemplate query row: CleanDecision, Iteration, and Decision tasks. There is always one CleanDecision task and one Decision task for each instance generated from a PerfTaskTemplate, but there may be any number of copies of the Iteration task, however.

Name Tag

The Name tag of a PerfTaskTemplate must be unique among all TestTaskTemplate and PerfTaskTemplate tags in a model. When a Dependency tag anywhere in the model uses TemplateName instead of Name, the dependency is on either a TestTaskTemplate or a PerfTaskTemplate. The TemplateName in the dependency must therefore match one of the named templates in the model. For a PerfTaskTemplate, a dependency on TemplateName produces a dependency on each of the generated decision tasks from the template. The form of each dependency is taken from the Dependency tag in the DependencyTemplate of the PerfTaskTemplate, as described below.

Query Tag

A TestTaskTemplate must have one Query tag, the contents of which is an SQL query string. This string will be passed through ADO to SQL Server to be resolved. The query can be a SQL select statement or a call to a stored process, as long as the result is a record set.

Iterations Tag

The value of this tag defines the number of times the Iteration task is replicated for the instance of the PerfTaskTemplate and may be a hard coded constant or determined by a global macro, in which case all instances of the PerfTaskTemplate run the same number of iterations. The value of this tag may also be a macro set from the query, in which case, each instance of the PerfTaskTemplate can have its own unique number of iterations.

CleanDecision Tag

This tag contains a single Task tag that defines the clean decision task for each test case. Like the Task tag in a TestTaskTemplate, this Task tag must contain BuildType and Platform tags to define the pool used by the task. Note that the clean decision task need not (and typically does not) run in the same pool as the test iterations. The clean decision task usually has little or no content, so it can run anywhere there is a spare computing machine, while the iterations must be run on the prepared performance test computing machines (i.e., on the computing machines that have been set up to run performance tests).

Iteration Tag

This tag contains a single Task tag, which defines the iteration task for each test case. There is a special macro (% iteration %) that expands to the ordinal number of each iteration (starting with 1). This macro is used in the task name to make each iteration task name unique.

Decision Tag

This tag contains a single Task tag, which defines the decision task for each test case.

CleanDecisionDependency Tag

This tag contains a single Dependency tag. This dependency is included in each Iteration task generated for the same instance of the template. By convention, the Dependency tag is written in the task models of this preferred embodiment with the task name included, but like a Dependency tag in the TestTaskTemplate, any Name, BuildType, SameBuildType, OS, and SameOS tags that appear are ignored. Only such additional tags as <ClearOnFail> matter.

DecisionDependency Tag

This tag, like the CleanDecisionDependency tag above, contains a single Dependency tag. One copy of this Dependency is included for each iteration task on the decision task of the same instance of the template. And, like all other template-based Dependency tags, only any <ClearOnFail> tag in it matters.

DependencyTemplate Tag

This tag contains a single Dependency tag. The embedded Dependency tag is treated like the Dependency tag of a TestTaskTemplate. One copy of this dependency is generated for each decision task generated from the PerfTaskTemplate. These dependencies are then inserted in the place where the original TemplateName dependency occurred. Like all other template-based Dependency tags, only any <ClearOnFail> tag in it matters.

System Config Files

A system Config File is a file of XML data that define a set of high-level control parameters for the system of the present invention. This file is used primarily by the TMG to guide its processing, but is also used by a number of individual tasks in the task models to look up relevant information. The Config File is formatted much like a task model, in that attributes are not generally used. All tags contain either other embedded tags or plain text contents.

Also, like task models, a special comment can be used to include other XML files. Since each queue has its own system Config File, a single global Config File is used for common parameters, and then the global Config File is included in each of the queue's separate Config Files.

The following breakdown of tags groups them by global tags, which we put in our global config file, and queue-specific tags which we put in the separate SNAP config files for each queue.

Global Config Tags

These tags typically define the SQL credentials for each database that the system will be using. Terms used in the global Config tags include:

TAW—Stands for Tactics Wrapper and is the database that the TMG consults to find test cases for TestTaskTemplate and PerfTaskTemplate queries.

RAID—This name is used to identify a bug tracking database. The information in this database is not directly used by core components of the present invention, but is used by the RAID bug resolver task employed in the code check-in processes.

Queue—Refers to the system database for your software test facility. In a previous embodiment, each queue could have a separate database server, but in this preferred embodiment, all queues are consolidated into a single lab-wide database.

Tuple—This refers to the Tuple database that handles the detailed processing of jobs. The TMG under this preferred embodiment of the invention obtains most of the database credentials for the Tuple from the system database itself, but a few control parameters are still retrieved from the Config File.

TAWServer Tag

This tag defines the name of the server computing machine containing the TAW database for this queue, but is not identified with a leading \\ on the server name. This name is not a UNC path to the server computing machine, but just the raw computing machine name.

TAWDB Tag

This tag defines the database name within the TAW server.

TAWUID Tag

This tag defines the user ID to employ when connecting to the TAW database.

TAWPWD Tag

This tag defines the password for the user ID employed when connecting to the TAW database.

QueueServer Tag

This tag defines the machine name of the database server for system database.

QueueDB Tag

This tag defines the name of the system database itself, within the server.

QueueView Tag

This tag defines the Queue view of the system database.

QueueUID Tag

This tag defines the user ID employed when connecting to the system database.

QueuePWD Tag

This tag defines the password for the user ID that is employed to connect to the system database.

Raid Tag

The raid tag (one of the rare cases of a tag beginning with a lower-case letter used in this preferred embodiment) defines the database credentials for the RAID database used for auto-resolving any bugs from the code checkins. This tag contains the following:
- server tag—defines the machine name of the RAID database server.
- database tag—defines the name of the RAID database within the server.
- user tag—defines the user ID employed to connect to the RAID database.
- password tag—defines the password for the user id used to connect to the Raid database.
- bugurl Tag—defines the base bug URL of a page called during processing of bugs. The string has the actual bug number appended before it is used.
- TupleFinishPing—contains a value, in seconds, of the amount of time to wait before retrying a failed connection to the Tuple database, or for periodically checking for a currently running job being finished. A larger value will reduce the contention of a heavily loaded Tuple database. Typically, a value of 10 is used for most circumstances.
- TupleConnectionTimeout tag—contains a value, in seconds, of the amount of time to wait when establishing a connection to the Tuple database. A typical value used is 10. A slow Tuple server might force an increase in this value.
- TupleStartJobTimeout tag—contains a value, in seconds, of the amount of time to wait when starting a job. This wait can be an expensive stored process call if a slow Tuple server or a large job definition is being employed. A value of 30 is typically employed.
- TupleCheckTimeoutTimeout tag—contains a value, in seconds, of the amount of time to wait when calling the CheckTimeout stored proc. This call is made once every TupeFinishPing interval and can be expensive. A typical value is 60.
- ControlJobModel tag—contains the UNC path of the control job task model for the Tuple database to run. Every Tuple database can run a distinct control job, with its own task model. Preferably, all Tuple databases run the same control job, so this tag is included in the global Config File, but alternatively, an operator may choose to specialize the control jobs and move this tag into a queue-specific system Config Files.

Queue-Specific Config Tags

Macros Tag

This tag actually appears both in the global Config and each queue-specific Config File (the one in the global Config File uses the MergeableTag attribute, which was described above), and can contain any number of other tags. Each tag that appears inside the Macros tag defines one macro. The name of the macro is the name of the embedded tag and the value of the macro is the string contents of that tag. Note that individual macro tags cannot contain complex XML, only simple strings or character DATA (CDATA).

QueueID Tag

This tag contains the name of the queue described by this system Config File. It is used by the TMG to lookup the corresponding Tuple and also to extract the individual jobs from the system database.

ExtensionFile Tag

This tag contains the name of a script and is used by the system command line to extend the core system behavior of the present invention.

CheckinAlias Tag

This tag contains the check-in mail alias and is used by the check-in automailer task when a job completes. It is not needed unless the check-in automailer task is included in the queue for the job.

FromAlias Tag

This tag contains the alias to use as the sender of summary mail and is used by the summary automailer when a job completes or fails. Again, this tag is not needed other than to run the summary automailer task in the job queue.

AbortCCAlias Tag

This tag contains the alias to CC on aborted summary mails and is used by the summary automailer when a job completes or fails, but is not needed if it is not required to run the summary automailer task in the job queue.

MergeDevID tag

This tag contains the mail alias to be used for all merged jobs. Each job must be associated with some developer ID, which should be distinct from all actual developers who will be submitting jobs.

CheckinTypes Tag

A queue-specific SNAP Config File must contain at least one CheckinTypes tag, but can contain as many different such tags as needed. One CheckinTypes tag must be defined for each distinct kind of job that will be processed in the queue. Each CheckinTypes tag must contain at least a Type tag and a ModelName tag. The Type tag is a string. By convention in this embodiment, if there is only one CheckinTypes tag in a Config File, it is given the type "Normal." When a job is submitted to a queue, it is assigned a check-in type. The type string assigned to a job must match one of the defined CheckinTypes for its queue.

The ModelName tag contains the path, written as either a UNC path or a local path that is valid for the TMG process, of the task model to use when processing this job type. Normally, task models are checked into a source tree. The system is designed to use this fact to allow for live updates of the task model. By doing this, it is possible to confidently make changes to the task model (such as adding a new form of test), because if the check-in for the task model fails, the system will automatically revert to the previous state of the task model. The system accomplishes this feature by checking the developer directory created for each job submission. If that directory contains a file with the same name as the default task model file name (excluding all directory information), then when the job is processed, the task model in the submission developer directory is used instead of the default model for that check-in type.

A CheckinTypes tag can contain a QueueJobInformation tag. This tag is used by the queuejob.wsf file, and the script is used to submit an arbitrary job to any queue. The tags embedded in the QueueJobInformation are copied to the dev XML file for the job being submitted. Any JobOwnerName tag in the QueueJobInformation is used as the developer ID of the submitted job. If no such tag exists in the Queue-JobInformation, then the job is submitted with the user ID of the user running the script.

ProjectRootEnvironmentVariable Tag

This tag defines the root of the Source Depot enlistment associated with the queue configured by this Config File. If the queue is not being used to perform checkins, this tag may be omitted.

CmdEnvironmentVars Tag

This tag contains a set of embedded tags. Each embedded tag is used to define an environment variable, with the name of the tag being the environment variable name and the contents being a simple string or CDATA element that becomes the value of the environment variable. Specifically, this tag is used by the sdtasks.wsf script, which is used to perform Source Depot operations on the check-in queues.

An Extended Exemplary Task Model

Included in the Appendix is the XML listing of a complete exemplary task model. This example is a check-in task model that has been run more than 100 times per week and is distributed across at least 45 computing machines. There are 21 separate basic tasks, plus one TestTaskTemplate and one PerfTaskTemplate. It does not illustrate all of the functionality of the present invention, but it certainly is representative of the richness of a task model as used in a preferred embodiment of the present invention. This example is an edited version of an actual check-in task model, since the detail of the listing has been reduced somewhat in the interest of brevity. By carefully reviewing the listing, the operation of the task model in carrying out distributed computing will be readily apparent, not only in regard to the specific exemplary application relating to check-in and testing of software code, but also, for many other applications that can benefit from distributed computing that is managed with efficiency and flexibility.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method for processing a job using a plurality of computing devices that communicate over a network, the job having at least one task to be done on a computing device, comprising the steps of:
   (a) creating a first database that includes a queue of computing jobs in which the job is listed, and parameters for each of the plurality of computing devices, said parameters indicating capabilities and characteristics of each computing device;
   (b) assigning each computing device from the plurality of computing devices to at least one pool set, based upon the parameters of the computing device, each pool set including at least one pool;
   (c) creating a second database in which each task of the job is indicated, along with a status indicating when the task is ready for execution, relative to any other task of the job;
   (d) assigning each task of the job to a specific pool, based upon capabilities and characteristics needed for a computing device to carry out the task, to ensure that the task is able to be carried out by any computing device included in the specific pool to which the task is assigned;
   (e) as a computing device from the plurality of computing devices becomes available to carry out a task, enabling said computing device to automatically request a task assigned to any pool in a pool set of the computing device;
   (f) in response to the request, providing a task assigned to any pool in the pool set of the computing device to said computing device for execution by the computing device, if the status of said task in the second database indicates that the task is ready for execution; and
   (g) repeating steps (e) and (f) to complete the job.

2. The method of claim 1, further comprising the step of assigning a priority to each task that is ready for execution, as indicated by the status of the task in the second database.

3. The method of claim 2, wherein the step of providing a task includes the step of selecting a task with the highest priority for execution by the computing device that is available, from tasks assigned to any pool in the pool set of said computing device.

4. The method of claim 1, wherein steps (e) and (f) are repeated until one of the following has occurred:
   (a) the job is completed, as determined from the status of the tasks of the job;
   (b) a failure of a task has interrupted execution of the job; and
   (c) the job has been manually interrupted.

5. The method of claim 1, wherein each task of a job is defined in a markup language file.

6. The method of claim 5, wherein each job in the plurality of computing jobs is defined by a task model that is coded in a separate markup language text file.

7. The method of claim 5, wherein a common task model is used for jobs of a specific type.

8. The method of claim 1, further comprising the step of providing a database that includes a plurality of templates, each template defining data for a task that may be executed by the plurality of computing devices.

9. The method of claim 1, wherein the job comprises testing a software program, and each task corresponds to a different test of the software program.

10. The method of claim 1, wherein each task is defined using at least one markup language tag.

11. The method of claim 1, further comprising the steps of:
   (a) setting the status of any task that has failed to complete on a computing device, to indicate that the task has not yet been completed; and
   (b) enabling the task that was not completed to again be made available for execution on a computing device.

12. A memory medium having processor executable machine instructions for performing the steps of claim 1.

13. A method for managing processing of a plurality of jobs in a distributed computing environment using a plurality of computing devices to complete the plurality of jobs, comprising the steps of:
   (a) adding each of the plurality of jobs as the job is submitted, to a job queue that is maintained on a job database, said job database also including a list of the computing devices and parameters for each computing device comprising characteristics and capabilities of each computing device that form a basis for assigning each of the computing devices to a pool set, each pool set comprising at least one pool;
   (b) providing a task model for each job, said task model being used to generate a plurality of tasks of the job, said plurality of tasks being included in a task database;
   (c) enabling any available computing device to request that one of the plurality of tasks included in the task database be provided for execution by the available computing device;
   (d) in response to said request from an available computing device, automatically selecting one of the tasks from the task database for execution by the available computing device, said one of the tasks being selected based upon the parameters of the available computing device and corresponding requirements for executing the task selected, so as to ensure that said available computing device can execute the task that is being selected; and
   (e) repeating steps (c) and (d) to process the plurality of jobs in the job queue.

14. The method of claim 13, further comprising the step of accessing a plurality of task templates that include data for completing tasks of the plurality of jobs, to process the plurality of jobs.

15. The method of claim 13, further comprising the steps of:
   (a) determining that a task included in the plurality of task is a virtual task;
   (b) producing a copy of the virtual task; and
   (c) selecting and providing the copy of the virtual task to the available computing device for execution thereby.

16. The method of claim 13, further comprising the step of maintaining a status of each task in the task database, said status indicating whether the task is ready to be executed.

17. The method of claim 16, further comprising the steps of:
   (a) determining a relative priority for the tasks included in the task database that are ready to be executed; and
   (b) automatically selecting said one of the tasks from the task database with the highest priority, from among the tasks that are:
      (i) then ready to be executed, as indicated by the status of the task; and
      (ii) can be executed by the available computing device.

18. The method of claim 17, further comprising the step of:
   (a) assigning each task to at least one pool, based upon the characteristics and capabilities required of a computing device to execute the task; and
   (b) wherein the step of selecting said one of the tasks comprises the step of selecting a task for execution by the available computing device for which said at least one pool to which the task is assigned is included in a pool set assigned to the available computing device.

19. A memory medium having processor executable machine instructions for performing the steps of claim 13.

20. A control system for a distributed computing system having a plurality of computing devices that are used to process a job, comprising:
   (a) a memory in which a plurality of machine instructions are stored;
   (b) a network interface coupled in communication with the plurality of computing devices; and
   (c) a processor coupled to the memory and the network interface, said processor executing the machine instructions, to carry out a plurality of functions, including:
      (i) maintaining a first database that includes parameters for each of the plurality of computing devices in the plurality of computing devices, said parameters indicating capabilities and characteristics of each computing device;
      (ii) assigning each computing device in the plurality of computing devices to at least one pool set, based upon the parameters of the computing device, each pool set including at least one pool;
      (iii) generating a second database that includes a plurality of tasks of the job, each task having a status indicating whether the task is currently ready for execution by one of the computing devices;
      (iv) assigning each task of the job to a specific pool, based upon capabilities and characteristics needed of a computing device to carryout the task, to ensure that the task is able to be carried out by any computing device included in the specific pool to which the task is assigned;
      (v) receiving a request from any computing device from the plurality of computing devices that is currently available to carry out a task, to execute a task assigned to any pool in a pool set of the computing device;
      (vi) in response to the request, providing a task assigned to any pool in the pool set of the computing device to said computing device for execution by the computing device, if the status of said task in the second database indicates that the task is ready for execution; and
      (vii) repeating the preceding two steps until the job is completed or terminated.

21. The control system of claim 20, wherein the machine instructions further cause the processor to assign a priority to each task that is currently ready for execution, as indicated by the status of the task in the second database.

22. The control system of claim 21, wherein the machine instructions further cause the processor to assign a task with the highest priority for execution by the computing device that is available, said task being selected from tasks assigned to any pool in the pool set of said computing device.

23. The control system of claim 20, wherein the job is terminated if:
   (a) a failure of a task has interrupted execution of the job; or
   (b) the job has been manually interrupted.

24. The control system of claim 20, wherein each task of the job is defined in a markup language file.

25. The control system of claim 20, wherein the job is defined by a task model that is coded in a separate markup language text file.

26. The control system of claim 25, wherein the machine instructions further cause the processor to maintain a queue of jobs in the first database, wherein a common task model is used for jobs of a specific type.

27. The control system of claim 20, wherein the machine instructions further cause the processor to maintain a database having a plurality of templates, each template defining data for a task that may be executed by the plurality of computing devices.

28. The control system of claim 20, wherein the job comprises testing a software program, and each task corresponds to a different test of the software program.

29. The control system of claim 20, wherein each task is defined using at least one markup language tag.

30. The control system of claim 20, wherein the machine instructions further cause the processor to set the status of any task that has failed to complete on a computing device, to indicate that the task has not yet been completed, so that the task is again available for execution on a computing device.

31. A system for managing processing of a plurality of jobs in a distributed computing environment using a plurality of computing devices to complete the plurality of jobs, comprising:
  (a) a memory in which a plurality of machine instructions are stored;
  (b) a network interface coupled in communication with the plurality of computing devices; and
  (c) a processor coupled to the memory and the network interface, said processor executing the machine instructions, to carry out a plurality of functions, including:
    (i) maintaining a job database in which a job queue includes the plurality of jobs to be processed, said job database also including a list of the computing devices and parameters for each computing device comprising characteristics and capabilities of each computing device that form the basis of the assignment of each of the computing devices to a pool set, each pool set comprising at least one pool;
    (ii) using a task model input for each job to generate a plurality of tasks of the job, and maintaining a task database that includes said plurality of tasks;
    (iii) receiving a request from any available computing device be provided one of the plurality of tasks included in the task database, for execution by the available computing device;
    (iv) in response to said request from an available computing device, automatically selecting one of the tasks from the task database for execution by the available computing device, said one of the tasks being selected based upon the parameters of the available computing device and corresponding requirements for executing the task selected, so as to ensure that said available computing device can execute the task selected; and
    (v) repeating the preceding two steps as required to process the plurality of jobs in the job queue.

32. The system of claim 31, wherein the machine instructions further cause the processor to access a plurality of task templates that include task-related data, for completing the tasks of the plurality of jobs.

33. The system of claim 31, wherein the machine instructions further cause the processor to maintain a status of each task in the task database, while a job is being processed, said status indicating whether the task is ready to be executed.

34. The system of claim 31, wherein the machine instructions further cause the processor to:
  (a) determine a relative priority for the tasks included in the task database that are ready to be executed; and
  (b) automatically select said one of the tasks with the highest priority from the task database, from among the tasks that are:
    (i) then ready to be executed, as indicated by the status of the task; and
    (ii) can be executed by the available computing device.

35. The system of claim 34, wherein the machine instructions further cause the processor to:
  (a) assign each task to at least one pool, based upon the characteristics and capabilities required of a computing device to execute the task being assigned; and
  (b) select said task for execution by the available computing device so that said at least one pool to which the task is assigned is included in a pool set assigned to the available computing device.

* * * * *

UNITED STATES PATENT AND TRADEMARK OFFICE
CERTIFICATE OF CORRECTION

| | |
|---|---|
| PATENT NO. | : 6,988,139 B1 |
| APPLICATION NO. | : 10/134335 |
| DATED | : January 17, 2006 |
| INVENTOR(S) | : Robert B. Jervis et al. |

It is certified that error appears in the above-identified patent and that said Letters Patent is hereby corrected as shown below:

In column 5, line 11, after "port" insert -- , --.

In column 28, line 47, delete "Config" and insert -- config --, therefor.

Signed and Sealed this

Twenty-third Day of March, 2010

David J. Kappos
*Director of the United States Patent and Trademark Office*